AMPLIFIER FOR READING MATRIX STORER
Filed April 12, 1961
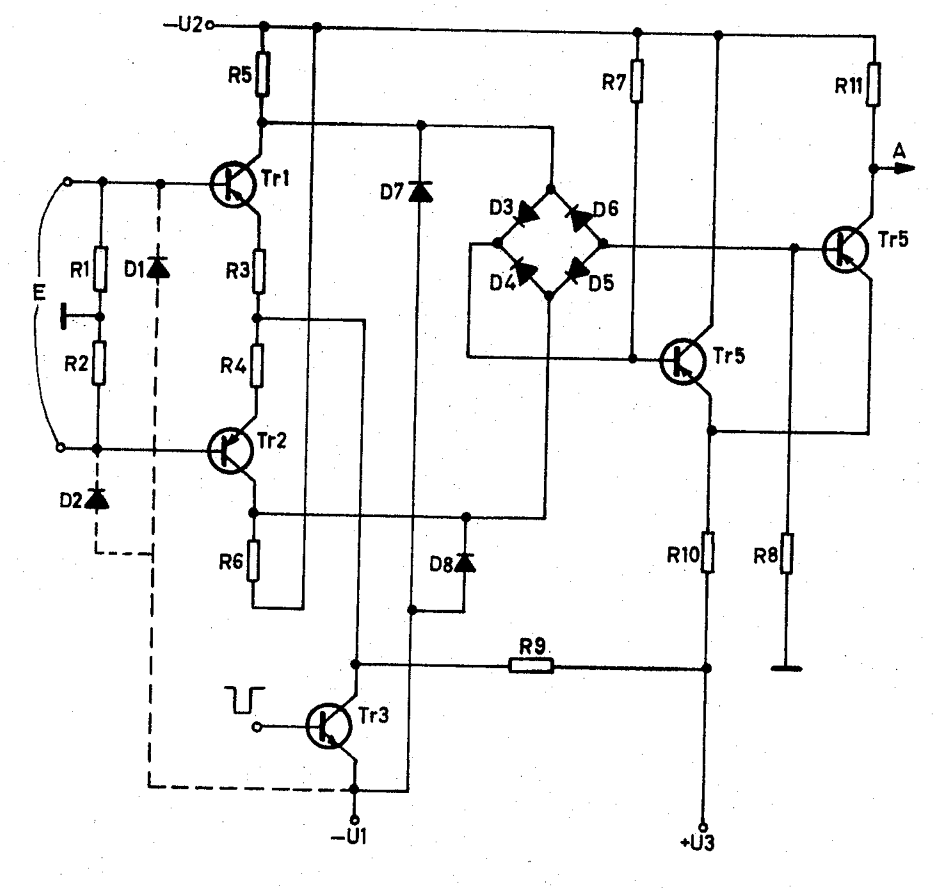

3,316,422
AMPLIFIER FOR READING MATRIX STORER

Hartwig Rogge, Munich, Germany, assignor to Siemens & Halske Aktiengesellschaft Berlin and Munich, a corporation of Germany Filed Apr. 12, 1961, Ser. No. 102,457
Claims priority, application Germany, Apr. 27, 1960, S 68,246
8 Claims. (Cl. 307—88.5)

This invention is concerned with an amplifier for reading a matrix storer, hereinafter briefly referred to as "reading amplifier."

It is known in connection with magnetic core matrix storers, that a core signal of positive or of negative polarity is, upon switching over of the magnetic cores from one to the other remanence condition, induced in the reading wire which is common to all magnetic cores. The duration of this signal is determined by the switching time of the magnetic cores and amounts generally to about 0.5 $\mu$s. to 2 $\mu$s. The amplitude amounts to about 20 mv. up to 100 mv. There are also coupled to the reading wire, from the information wire which is likewise common to all cores of a matrix, interference voltage peaks which can, with unfavorable distribution of the information, lie one to two orders of magnitude (2 volt and more) above the amplitude of the magnetic core signals. However, this is not a characteristic which is peculiar to magnetic core matrix storers; interference signals with similar relationship to operatively utilized signals also appear in the connection with other known matrix storers.

The signal given off from a storage element of the matrix storer and appearing on the reading wire, is generally preamplified with the aid of an amplifier, for example, a transistor, and is rectified in a differential transformer. The high interference voltage peaks appearing in such circuit arrangements on the reading wire, block the amplifier input stage, so that the next reading operation can continue only after the lapse of some time interval of a few $\mu$s. to a few 10 $\mu$s., thereby greatly limiting the permissible cycling sequence of the matrix storer.

This drawback is avoided by a known circuit arrangement which is, however, designed only for signals of one polarity. The known direct current coupled transistor amplifier is, during the time in which high interference voltage can appear, blocked by a negative pulse which is applied at the emitter of the input transistor. The amplitude of the interference voltage might amount to about three volt. A new signal can be amplified about two $\mu$s. after the conclusion of this blocking pulse. As noted before, a disadvantage of this known circuit arrangement resides in the fact that only unipolar pulses can be amplified; moreover, the regeneration interval of two $\mu$s. for a cycling duration of the same order of magnitude is still too long.

The object of the invention is to eliminate the disadvantages of the known circuit arrangement.

This is accomplished, in connection with a two-stage reading amplifier, by constructing the first stage as a differential amplifier which is made conductive briefly only for the duration of a pulse to be amplified, and by improving the signal-interference-ratio by the provision, between the two stages, of a bridge circuit comprising diode rectifiers.

In an advantageous embodiment of the invention, the first stage comprises two transistors of similar conduction type, which are mutually symmetrically circuited, the emitters of these transistors being interconnected over symmetrizing or feedback coupling resistors and being connected with the collector of a further transistor of opposite conduction type, which further transistor is by a triggering pulse briefly blocked for the duration of a pulse to be amplified, thereby controlling the first noted transistors which are connected therewith, so as to make them conductive.

The construction of the first stage of the reading amplifier, as a differential amplifier results in phasing amplification of the interference voltages which appear phased at the two amplifier inputs. The effect of such voltages can thereby be easily suppressed by subsequent difference formation, while the reading signal given off from the matrix storer is amplified without any disturbance. Moreover, only about one half of the interference voltage amplitude will appear at the two inputs of the reading amplifier. A further advantage of the circuit arrangement according to the invention resides in the fact that pulses of any polarity can also be amplified therewith.

According to another feature of the circuit arrangement conforming to the present invention, there is disposed between each of the two input conductors and a fixed voltage source, a diode rectifier, which limits the interference voltages appearing on the input line to a value determined by the voltage source.

The various objects and features of the invention will now be explained with reference to the accompanying drawing which shows an embodiment thereof.

The reading amplifier illustrated in the drawing comprises in the main two transistors *Tr*1 and *Tr*2 forming in the first stage a differential amplifier, and transistors *Tr*4 and *Tr*5 which are circuited in known manner in the second stage. Between the two stages is arranged a bridge circuit comprising diode rectifiers D3, D4, D5 and D6. There is also provided a transistor *Tr*3 which is of a conduction type opposite to that of the remaining transistors. The emitters of the transistors *Tr*1 and *Tr*2 are interconnected over symmetrizing and feedback resistors R3, R4, with the center point connected to the collector of the transistor *Tr*3, and the collectors of the transistors *Tr*1, *Tr*2 are connected to a negative voltage —U2 over resistors R5, R6. The reading wire coming from the matrix storer (not shown) is to be connected to the two terminals E.

The transistor *Tr*3 is conductive in the normal or resting condition, that is, during the time when no reading signal can be present at the two terminals E, and negative voltage —U1 is accordingly on the emitters of the transistors *Tr*1 and *Tr*2, which are interconnected over the two symmetrizing and feedback resistors R3 and R4. It is thereby required that the absolute value of the voltage —U2 is higher than the absolute value of the voltage —U1.

According to a further advantageous feature of the invention, there are provided diode rectifiers D1 and D2 which are respectively disposed each between a conductor extending from an input terminal E and the fixed voltage —U1. These two rectifiers are operative to limit the interference voltage peaks to the value of the voltage —U1. Interference voltage peaks which are lower than —U1 do not affect the amplifier.

The first stage of the reading amplifier, which is constructed as a differential amplifier, is in accordance with the invention controlled so as to be briefly conductive only for the duration of the pulse which is to be amplified. This is accomplished by briefly blocking the normally conductive transistor *Tr*3 for the duration of the voltage pulse which is to be amplified, by the action of a triggering pulse which is extended to the base thereof, thereby causing an increase of the emitter potential of the transistors *Tr*1 and *Tr*2 and making these transistors conductive so as to effect amplification of the signal which had been extended to the amplifier input. Accordingly, interference voltage can become effective only if it appears during the application of the triggering pulse. Interference voltages appearing at any other instant can assume any possible value without affecting the amplifier.

The normal input impedance of the circuit, represented by the resistors $R1+R2$, can be dimensioned so that interference voltages will decay very rapidly.

The amplified input signals which may appear with either one of the two polarities, are rectified in the bridge comprising the diode rectifiers D3, D4, D5 and D6. The amplification of the input stage can be adjusted, by the values of the feedback resistors R3 and R4, so that only signals lying above a given threshold value are amplified to an extent required for the triggering of the rectifier bridge. The signal-interference-ratio is considerably improved owing to the bend in the characteristic curve of the diode rectifiers.

The difference of the rectified signals is thereupon amplified in the second stage of the reading amplifier, which comprises the two direct current coupled transistors T*r*4 and T*r*5. Disturbances appearing at the two inputs E with identical polarity and amplitude, for example, with capacitive coupling of the interference voltages through the symmetrical input circuit, are thereby made ineffective at the amplifier output. The resistors R7 and R8 of the second stage are advantageously dimensioned so as to assure in normal or resting condition and at very small signal differences, blocking of the transistor T*r*5 while the transistor T*r*4 is conductive. In case a greater signal difference appears at the output of the rectifier bridge, the base of the transistor T*r*4 becomes positive and such transistor will become blocked, thus making the emitter of the transistor T*r*5 positive while its base becomes at the same time negative. The transistor T*r*5 which is blocked in normal condition or in the presence of low signal values, is in this manner made conductive and a positive output pulse A is given off at its collector, which can be utilized, for example, for the switching of a bistable flip flop stage (not shown).

The coupling in the entire reading amplifier shown in the drawing is effected in direct current manner. The signal sequence which is to be processed is thus merely determined by the switching times of the transistors employed. It is clear, of course, that these switching times must be short as compared with the duration of the triggering pulse which governs the operation of the transistor T*r*3.

The influence of the switching- and diode capacitances is reduced by limiting the collector voltage of the transistors T*r*1 and T*r*2 to the value of the voltage —U1, which is effected by the action of the diode rectifiers D7 and D8, such rectifiers being connected with the emitter of the transistor T*r*3 to which is connected the voltage —U1. Undesirably high voltage displacements are in this manner avoided. A low current flows continuously over the resistors R7 and R8 through the diode rectifiers D3 to D6 of the bridge circuit, and the capacitance thereof remains accordingly in blocked condition without effect on the switching times.

Details of the reading amplifier may differ from those illustrated in the drawing, and changes and modifications may accordingly be made within the scope and spirit of the appended claims which define what is believed to be new and desired to have protected by Letters Patent.

I claim:

1. A two-stage amplifier for reading a matrix storer, comprising a first stage which is constructed as a differential amplifier, line means for conducting to said first stage pulses which are to be amplified, means for causing said first stage to become briefly conductive only for the duration of a pulse which is to be amplified, a second stage for receiving pulses passed by said first stage and for amplifying such pulses, and means forming a bridge circuit comprising rectifiers disposed between said first and said second stage for improving the signal-interference-ratio.

2. An amplifier according to claim 1, wherein said first stage comprises two transistors of identical conduction type which are mutually symmetrically circuited, a further transistor of opposite conduction type, resistor means functioning as symmetrizing and feedback resistor means disposed between said two first named transistors, means for interconnecting the emitters of said two transistors over said resistor means and means for connecting said emitters with the collector of said further transistor, said further transistor being normally conductive to apply a blocking potential to the emitters of said first named two transistors so as to render such transistors nonconductive, and means for conducting to said further transistor a triggering pulse for the duration of a pulse to be amplified so as to make said first named two transistors conductive for passing such pulse.

3. An amplifier according to claim 2, wherein said first stage comprises two transistors, and a rectifier for connecting the collector of each transistor of said first stage with a fixed voltage source.

4. An amplifier according to claim 1, wherein said line means comprises two conductors, a fixed voltage source, and a rectifier connected between each of said conductors and said voltage source for limiting interference voltages appearing on said conductors to a value corresponding to that of said voltage source.

5. An amplifier according to claim 2, wherein said line means comprises two conductors, a fixed voltage source, and a rectifier connected between each of said conductors and said voltage source for limiting interference voltages appearing on said conductors to a value corresponding to that of said voltage source.

6. An amplifier according to claim 2, comprising a rectifier for connecting the collector of each transistor of said first stage with a fixed voltage source.

7. An amplifier according to claim 4, comprising a rectifier for connecting the collector of each transistor of said first stage with a fixed voltage source.

8. An amplifier according to claim 5, comprising a rectifier for connecting the collector of each transistor of said first stage with a fixed voltage source.

References Cited by the Examiner

UNITED STATES PATENTS

| | | | |
|---|---|---|---|
| 2,972,065 | 2/1961 | Hayes | 307—88.5 |
| 2,986,650 | 5/1961 | Wolfendale | 307—88.5 |
| 3,076,135 | 1/1963 | Farnsworth et al. | 307—88.5 X |

OTHER REFERENCES

Millman and Taub: "Pulse and Digital Circuits," McGraw Hill Book Co., 1956 (pp. 21 and 22 relied upon).

ARTHUR GAUSS, *Primary Examiner.*

HERMAN KARL SAALBACH, JOHN W. HUCKERT, *Examiners.*

J. JORDAN, *Assistant Examiner.*